(No Model.)

C. B. BOWLING.
PNEUMATIC TIRE.

No. 534,599. Patented Feb. 19, 1895.

Witnesses
C. A. Ford.

By his Attorneys.

Inventor
Clarence B. Bowling;

UNITED STATES PATENT OFFICE.

CLARENCE BENJAMINE BOWLING, OF BURR OAK, MICHIGAN, ASSIGNOR TO B. S. BOWLING AND SARAH A. BOWLING, OF SAME PLACE.

PNEUMATIC TIRE.

SPECIFICATION forming part of Letters Patent No. 534,599, dated February 19, 1895.

Application filed October 26, 1893. Serial No. 489,160. (No model.)

*To all whom it may concern:*

Be it known that I, CLARENCE BENJAMINE BOWLING, a citizen of the United States, residing at Burr Oak, in the county of St. Joseph and State of Michigan, have invented a new and useful Pneumatic Tire, of which the following is a specification.

My invention relates to tires, and has special reference to pneumatic tires for use in connection with bicycles and similar vehicles.

The object of my invention is to provide a protective shield to be arranged between the shoe and the expansible tube of a pneumatic tire to protect the latter from puncture by sharp objects with which the tire comes in contact, such shield being composed, in part, of metal strips so arranged as to avoid frictional contact between the metal parts or members.

I am aware of the use of metallic protective shields in connection with tires, but in order to avoid the friction and wear, both upon the metal and upon contiguous portions of the tire, I provide a flexible backing or webbing to which the strips are secured by means of cement or other adhesive substance, whereby contiguous strips of metal are separated sufficiently to avoid contact in use.

Further objects and advantages of my invention will appear in the following description, and the novel features thereof will be particularly pointed out in the appended claims.

Figure 1:
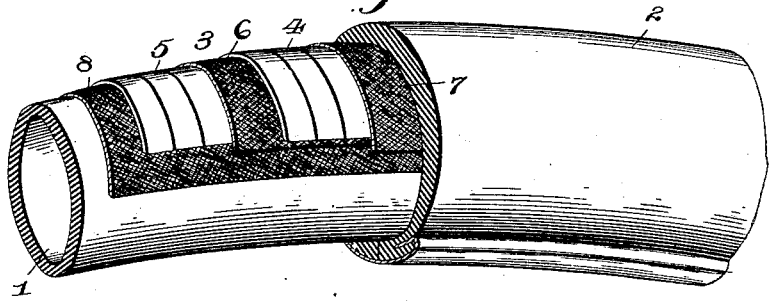
Figure 2:
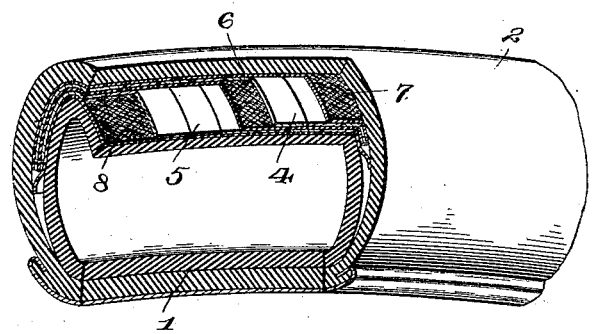
Figure 3:
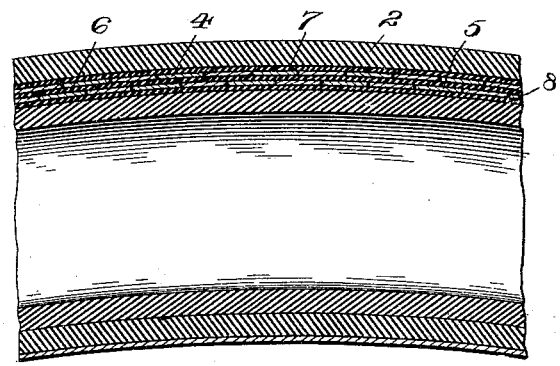

In the drawings: Figure 1 is a perspective view of a portion of a tire constructed in accordance with my invention, the same being broken away to show the different layers of material. Fig. 2 is a perspective section of a portion of the tire. Fig. 3 is an axial section of the same.

Similar numerals of reference indicate corresponding parts in all the figures of the drawings.

1 represents the expansible air-tube; 2, the shoe which is ordinarily constructed of rubber, and 3 the interposed protective shield embodying my invention. This shield is constructed, essentially, of layers of thin metallic strips, preferably spring steel, which are secured to contiguous layers of fabric, such as canvas, by means of cement or other adhesive substance, such fabric forming a webbing or backing which permits free, independent movement of the strips comprising the layers and prevents the shield from interfering with the flexibility of the tire. In the construction which I have illustrated, the shield is composed of duplicate inner and outer layers of metallic strips, which are separated by an interposed layer of fabric, the strips in one layer being arranged to break joint with the strips in the other layer, so as to prevent a sharp instrument which may be inserted between the joints of the outer layer from reaching the air-tube. The outer surface of the outer layer of strips, and the inner surface of the inner layer of strips, are covered by layers of fabric similar to that which is employed to separate the layers of strips.

4 and 5 designate, respectively, the outer and inner layers of strips, separated by the interposed webbing or backing 6, and covered upon opposite sides by the outer layer of fabric 7 and the inner layer of fabric 8. Said inner layer of fabric is extended beyond the edges of the layers of metallic strips and is secured at its edges to the inner surface of the shoe 2, thus forming a smooth or beveled edge or surface for contact with the outer surface of the expansible tube.

The strips in each metallic layer are arranged in a common plane with their edges contiguous but not overlapping, whereby each strip is separated from its neighbors by a small interval which is sufficient to prevent contact and avoid chafing, and the strips are prevented from being displaced, to alter this relative arrangement, by means of the cement or adhesive material by which the strips are secured to the webbing or backing. The cement or adhesive material which I prefer to employ in this connection is vulcanized rubber, which is applied between the metallic strips and the adjacent surfaces of the fabric, and is vulcanized by means of hot irons arranged upon the outer surfaces of the layers of fabric.

When completed, the shield presents a compact unitary construction composed of the alternately-disposed metallic and flexible layers, which is comparatively light in weight and is sufficiently yielding to avoid interfering with the flexibility of the shoe.

From the above description it will be understood that the construction of the shield may be and preferably is completed before application to the tire, thus adapting it for sale as an independent article of manufacture; and that the shield is preferably attached to the shoe of the tire rather than to the inflatable tube, thus permitting free contraction and expansion of the latter without the risk of displacing the shield. Furthermore, the improved shield is made of less width than the circumference of the inflatable tube, in the first place, because there is no necessity for a shield except for that portion of the tube which is adjacent to the exposed side of the tire, and therefore the continuance of the shield to the inner side of the tire adds to the weight without increasing the efficiency of the shield, and in the second place, because a shield of a given size may be attached to tires of different sizes, and at the same time sufficient space at each lateral edge of the shield is provided to permit of the attachment to the inner surface of the shoe of the extensions of one of the layers of fabric. By the construction as above described, a new inflatable tube may be introduced without affecting the protective shield.

Various changes in the form, proportion, and the minor details of construction may be resorted to without departing from the principle or sacrificing any of the advantages of this invention.

Having described my invention, what I claim is—

1. As a new article of manufacture, the herein described protective shield for inflatable tires, the same comprising a plurality of layers of metallic strips and webbing or fabric, alternately arranged and cemented together, the terminal layers being of webbing or fabric and one of them being extended beyond the metallic layers to provide means for the attachment of the shield to the inner surface of the shoe of a tire, substantially as specified.

2. The combination with a tire having an exterior shoe and an inclosed inflatable tube, of a protective shield, of less width than the circumference of the inflatable tube, and adapted to be attached permanently to the inner surface of the shoe to cover the said inner surface of the tread or exposed portion of the same, said shield comprising alternate layers of continuous webbing or fabric and interposed transversely arranged metallic strips, the strips in each layer being arranged with their contiguous edges out of contact and the strips in one layer being arranged to break joints with the strips in the adjacent layer, said alternate layers of webbing or fabric and metallic strips being connected by cement or adhesive material and the inner layer of webbing or fabric, or the layer which is adjacent to and comes in contact with the surface of the inflatable tube, being extended laterally beyond the edges of the other layers to form an edge for attachment by cement or adhesive material to said inner surface of the shoe, whereby the inflatable tube is removably arranged within the tube, substantially as specified.

3. The herein described protective shield for the exposed sides or treads of tires, comprising duplicate parallel layers of transversely-disposed metallic strips disposed in the layers at intervals to avoid friction between adjacent edges, and the strips in each layer being arranged to break joints with the strips in the other layer, an interposed layer of fabric to the opposite surfaces of which the metallic strips are secured by cement or other adhesive material, and outer and inner layers of fabric secured by cement or adhesive material to the exposed surfaces of the layers of metallic strips, the lateral edges of the inner layer of fabric being extended beyond the ends of the metallic strips to form flaps for attachment to the inner surface of a tire, substantially as specified.

In testimony that I claim the foregoing as my own I have hereto affixed my signature in the presence of two witnesses.

CLARENCE BENJAMINE BOWLING.

Witnesses:
FRANK. A. GALLOWAY,
FRANK PEASE.